(12) United States Patent
Lee

(10) Patent No.: US 7,672,271 B2
(45) Date of Patent: Mar. 2, 2010

(54) METHOD OF CONSTRUCTING WIRELESS HIGH SPEED BACKBONE CONNECTION THAT UNIFIES VARIOUS WIRED/WIRELESS NETWORK CLUSTERS BY MEANS OF EMPLOYING THE SMART/ADAPTIVE ANTENNA TECHNIQUE AND DYNAMICALLY CREATING CONCURRENT DATA PIPELINES

(75) Inventor: Hyun Lee, 21 Thalia St., Ladera Ranch, CA (US) 92694

(73) Assignee: Hyun Lee, Ladera Ranch, CA (US)

( * ) Notice: Subject to any disclaimer, the term of this patent is extended or adjusted under 35 U.S.C. 154(b) by 671 days.

(21) Appl. No.: 11/644,182

(22) Filed: Dec. 21, 2006

(65) Prior Publication Data

US 2007/0147361 A1    Jun. 28, 2007

Related U.S. Application Data

(60) Provisional application No. 60/753,752, filed on Dec. 22, 2005.

(51) Int. Cl.
*H04W 4/00* (2009.01)
(52) U.S. Cl. .................. 370/328; 370/536; 370/338
(58) Field of Classification Search .............. 370/328, 370/536
See application file for complete search history.

(56) References Cited

U.S. PATENT DOCUMENTS

| 7,408,994 | B1 * | 8/2008 | Wong et al. ............... 375/257 |
| 7,457,299 | B2 * | 11/2008 | Fette et al. ............... 370/401 |
| 2004/0017785 | A1 * | 1/2004 | Zelst ............... 370/328 |
| 2004/0264403 | A1 * | 12/2004 | Fette et al. ............... 370/328 |
| 2005/0164664 | A1 * | 7/2005 | DiFonzo et al. ............ 455/277.1 |

* cited by examiner

Primary Examiner—Rafael Pérez-Gutiérrez
Assistant Examiner—Issam Chakour

(57) ABSTRACT

In accordance with the present invention, there is provided a high-speed wireless backbone connection, Backbone Connection Facilitator (BCF), to create a wireless home network, which may consist of many short-range wired/wireless networks. BCF dynamically creates concurrent data pipelines to meet the data bandwidth demand to transfer packets from one short-range wired/wireless network to another. BCF employs the newly developed antenna technologies (ex. MIMO, SDMA) to minimize the transmit power, to reduce the interferences, and to support the real time communication.

BCF contains the BCF-PHY layer, the BCF-Data-Link-Layer, and the BCF-Network-Layer. The BCF-PHY layer consists of antenna array, a PHY Base Band controller, and a digital beam former. The BCF-Data-Link-Layer provides the MAC functionality. The BCF-Network-Layer assembles the packet, provides the source and destination address, and provides the BCF-PHY beam forming information. The BCF-Network-Layer is also responsible for parsing and assembling the packet payloads for the high-speed backbone connection.

16 Claims, 7 Drawing Sheets

■ Device with Backbone connection capability

○ Individual Wired/Wireless network and its range

～ Adaptive antenna beam patents carrying high-speed data (ex. 1-2Gbps via 60GHz UWB frequency using different protocol than the individual short-range wired/wireless network)

▒ Home area (boundary of home)

(600): Multi-Channel/Uni-Cast backbone Connector – Direct Wireless Connection with concurrent high-speed data pipeline between more than two 'short-range wired/wireless network' clusters within a home or a small office

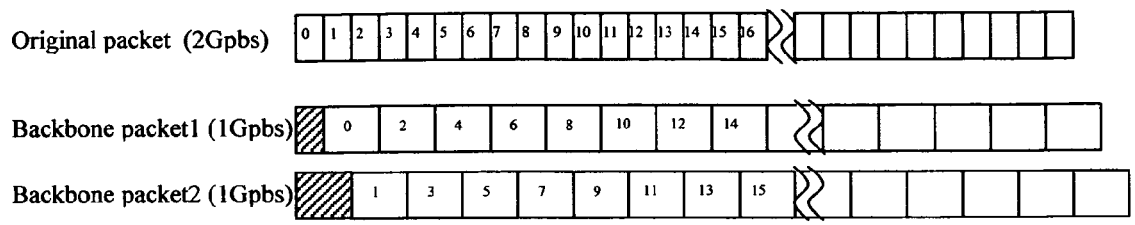
Figure 1 (100): Packet Splitter – High data rate single packet being transferred via 2 slower rate BCF packets

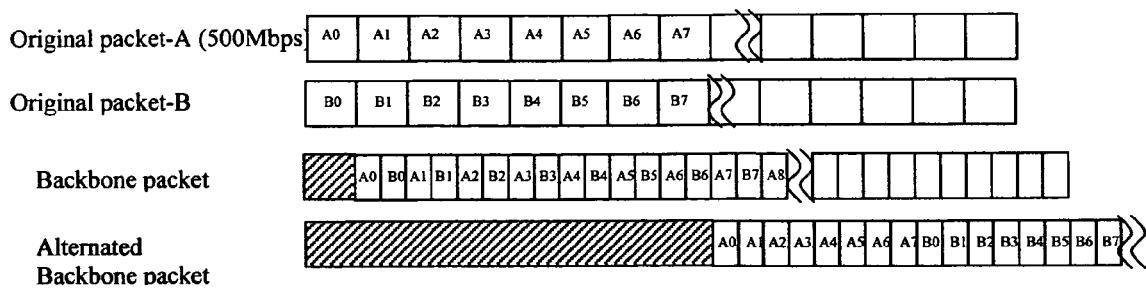
Figure 2 (200): Packet Merger – Two slower data rate packets are transferred via a single high data rate BCF packet

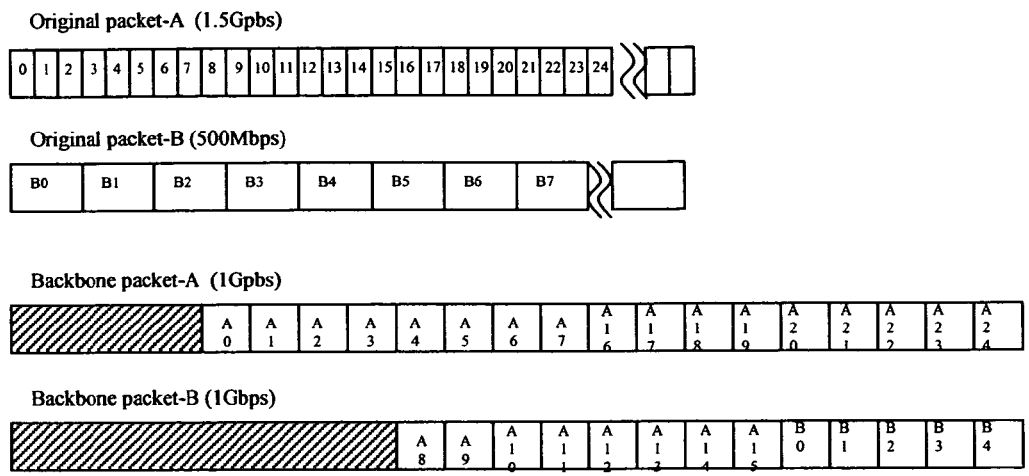
Figure 3 (300): Packet Mixer – Data generated by a low data rate source and a high data rate source are being transferred as two high data rate BCF packet

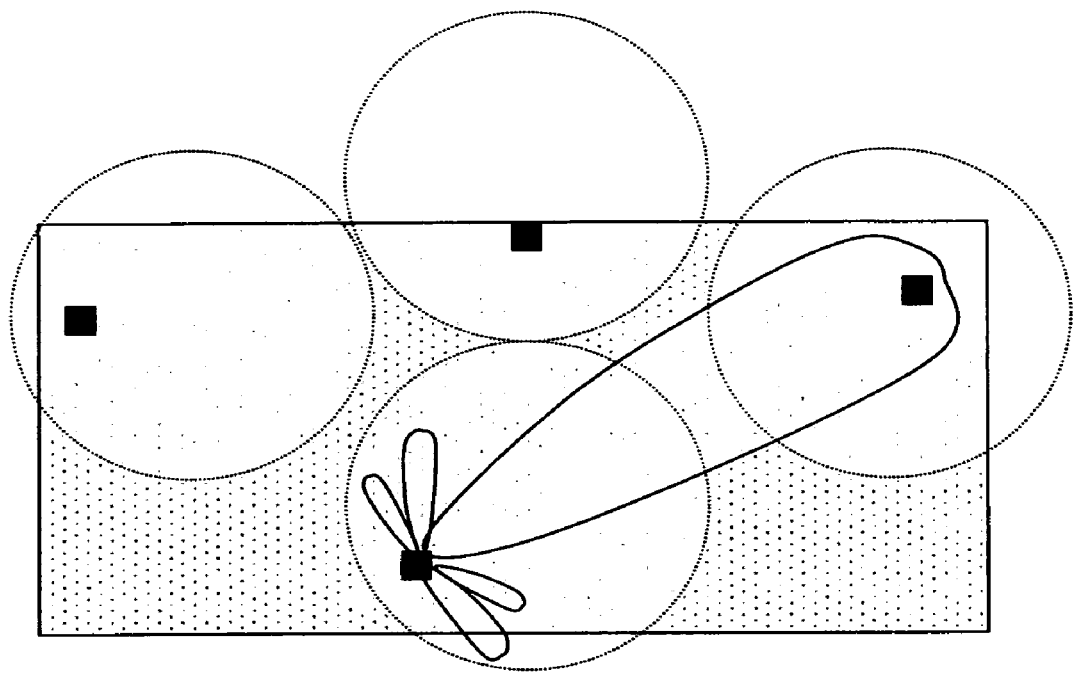

 Device with Backbone connection capability

 Individual Wired/Wireless network and its range

 Adaptive antenna beam patent carrying high-speed data (ex. 1-2Gbps via 60GHz UWB frequency using different protocol than the individual short-range wired/wireless network)

 Home area (boundary of home)

Figure 4 (400): Single Channel Backbone Connector – Direct wireless connection between two 'short-range wired/wireless network' clusters within a home or a small office

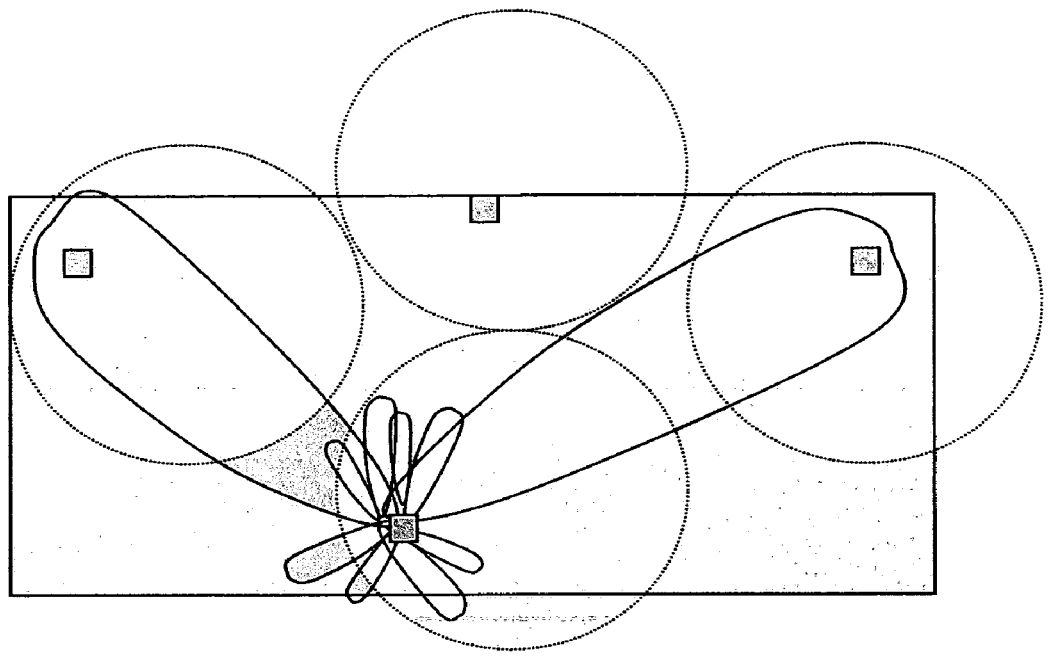

   Device with Backbone connection capability

   Individual Wired/Wireless network and its range

   Adaptive antenna beam patents carrying high-speed data (ex. 1-2Gbps via 60GHz UWB frequency using different protocol than the individual short-range wired/wireless network)

   Home area (boundary of home)

Figure 5 (500): Multi-Channel/Multi-Cast backbone Connector – Direct Wireless Connection among more than two 'short-range wired/wireless network' clusters within a home or a small office

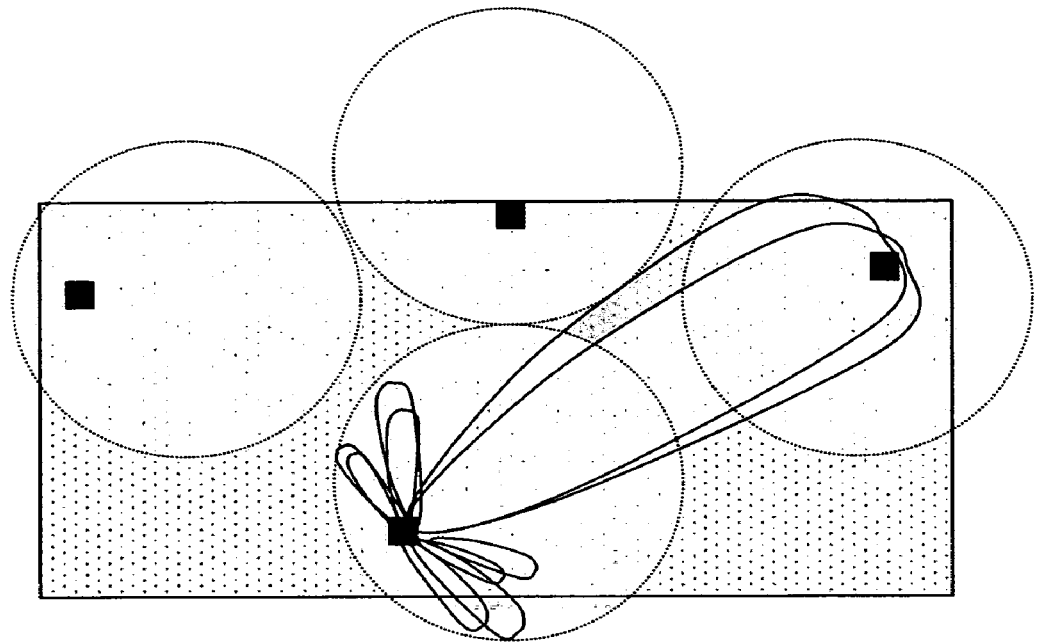

 Device with Backbone connection capability

 Individual Wired/Wireless network and its range

 Adaptive antenna beam patents carrying high-speed data (ex. 1-2Gbps via 60GHz UWB frequency using different protocol than the individual short-range wired/wireless network)

 Home area (boundary of home)

Figure 6 (600): Multi-Channel/Uni-Cast backbone Connector – Direct Wireless Connection with concurrent high-speed data pipeline between more than two 'short-range wired/wireless network' clusters within a home or a small office

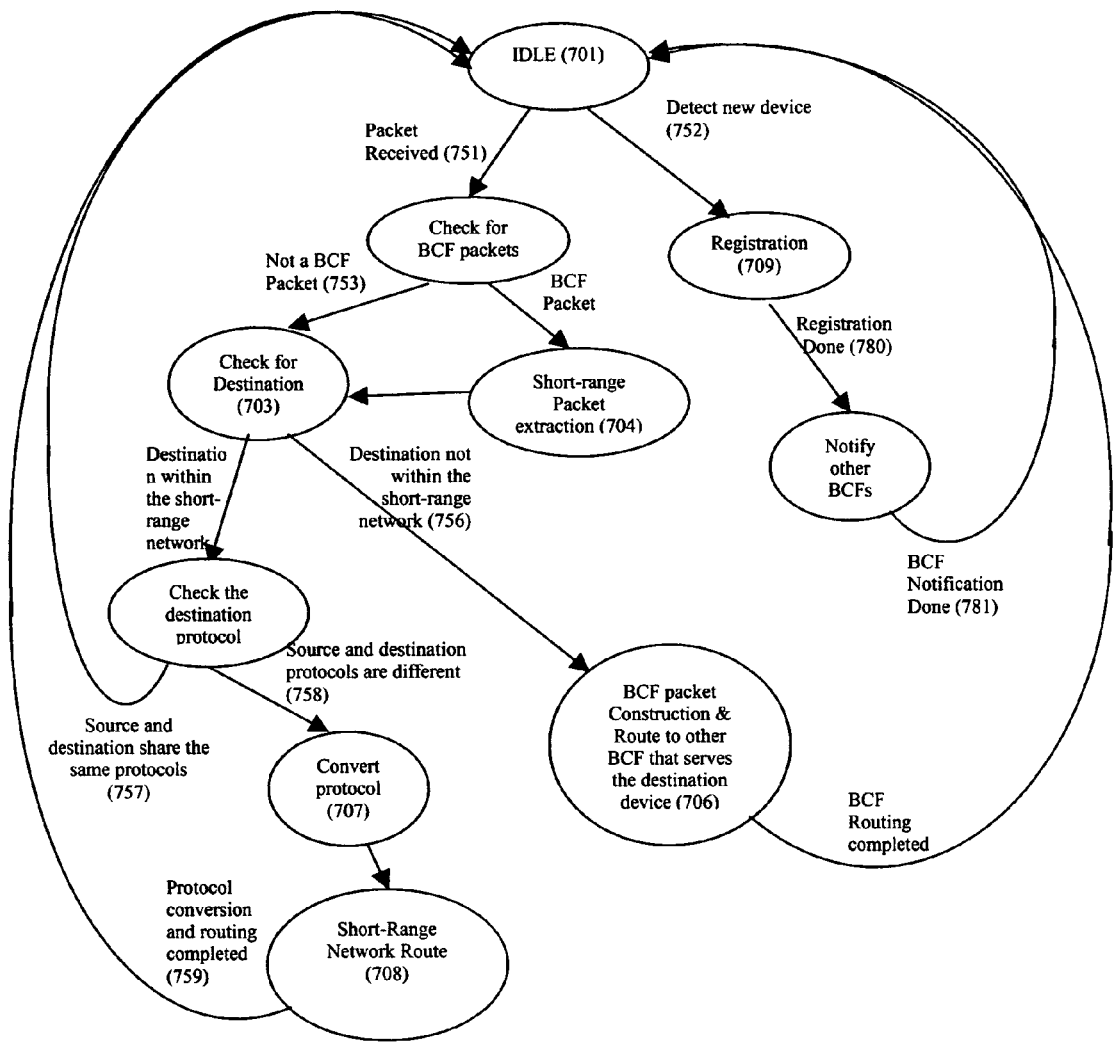
Figure 7 (700): Example State Diagram of the BCF that connects 'short-range wired/wireless network' clusters within a home or a small office

METHOD OF CONSTRUCTING WIRELESS HIGH SPEED BACKBONE CONNECTION THAT UNIFIES VARIOUS WIRED/WIRELESS NETWORK CLUSTERS BY MEANS OF EMPLOYING THE SMART/ADAPTIVE ANTENNA TECHNIQUE AND DYNAMICALLY CREATING CONCURRENT DATA PIPELINES

RELATED APPLICATIONS

The present application is a continuation application of U.S. provisional patent application, Ser. No. US60/753,752, filed Dec. 22, 2005, by Hyun Lee, included by reference herein and for which benefit of the priority date is hereby claimed.

FIELD OF THE INVENTION

The present invention relates to the fields of wireless communication. Particularly, it focuses on the Wireless Home Area Network (WHAN) and the Wireless Personal Area Network (WPAN).

BACKGROUND OF THE INVENTION

In general, homes contain various wired/wireless networks, such as DTV, RGB, Coaxial Cable, 1394, wired/wireless Ethernet, USB connection, etc. Most of these networks contain a limited number of devices that share the same communication protocol. In effort to consolidate these wired/wireless networks in a home, a number of UWB groups proposed various protocols (ex. WiMedia) to wirelessly connect these wired/wireless devices. However, these proposals limit the physical communication range of each wireless network, which can be defined as a 'short-range wired/wireless network' cluster. Its operation range is about 10 meters or less, and each cluster operates independently to each other. In fact, the most home (or personal) networking protocols do not address the inter-operability of these clusters.

Furthermore, the current WHAN/WPAN protocols actually promote the privacy of each 'short-range wired/wireless network' cluster so that each network is presented as a person's private network.

Thus, the currently proposed wireless network protocols are not capable of providing a seamless wireless home communication network since wireless devices located in a house can be more than 10 meters apart. This means that two or more 'short-range wired/wireless network' clusters are required to cover the physical space of a home or a small office.

The WHAN/WPAN protocols also do not have provision for dynamically constructing data pipelines to support dynamically changing wireless network activities in home (ex. watching a movie while making a video copy).

There are three current proposals that are presented by working groups to address the aforementioned problems.

The first proposed solution is constructing a home network that is similar to the cell phone network.

In the cell phone network, the cell (cluster) base stations are stationary and permanent. Since theses base stations can easily connected with various methods, any wireless mobile device can communicate with each other via one or more base stations, which can be connected via wired or wireless medium.

The second proposal is employing the currently developed 802.11n protocol to connect various home networks.

Another suggestion is using the 802.15.3.c, which is the next generation high data rate UWB that operates in the frequency range of 57-64 GHz and the maximum data rate of 800 Mbps-2 Gbps.

However, these solutions do not work for the following reasons.

The cell phone network protocol could not be used to connect mobile devices in various wireless network clusters.

Since the cell phone network does not allow dynamically varying through-put rate and dynamically changing communication channel as the WHAN and WPAN protocols require, the concept of the cell phone network protocol would not directly apply to establish a practical home network that consists of a number of WHANs and WPANs.

The 802.11n protocol would be able to directly connect various WHAN of WPAN networks. However, the 802.11n protocol alone is not a viable candidate for connecting the home networks since it is only capable of supporting a data transfer rate of 100 Mbps, which is much slower than the data rate required to support the HDMI/HDPC protocol (6 Gbps).

The 802.15.3c data rate is enough to support the current home entertainment networks (HDTV requires ~20 Mbps). However, it alone does not provide wide enough data pipeline to support the HDMI/HDPC protocol, which is definitely becoming the de-facto standard of home entertainment networks since the Motion Picture Association of America (MPAA) supports the HDMI/HDPC protocol.

It is therefore an object of the invention to produce a practical wireless home network system that provides connection among any wireless devices, including mobile devices that may belong to different WHAN/WPAN clusters.

It is another object of the invention to produce a practical wireless home network system that provides connection among any wireless devices that are located outside of the communication range of each WHAN/WPAN cluster.

It is another object of the invention to produce a practical wireless home network system that provides a point-to-point connection between any two wireless devices regardless of the distance between them.

It is another object of the invention to produce a practical wireless home network system that supports high data rate transfers among any wireless devices either within the same cluster or spread out among many different clusters.

It is another object of the invention to produce a practical wireless home network system that supports high data rate transfer among any wireless devices regardless of the distance between them.

It is another object of the invention to produce a practical wireless home network system that supports simultaneous transfers of data between different pairs of wireless devices regardless of the distance between each pair of devices.

It is another object of the invention to produce a practical wireless home network system that supports broad-casting or multi-casting of data from a wireless device to the other wireless devices in the home network.

It is another object of the invention to produce a practical wireless home network that dynamically increases the data bandwidth by occupying unused communication channels.

SUMMARY OF THE INVENTION

In accordance with the present invention, there is provided a high-speed wireless backbone connection to create a home network, which consists of a number of 'short-range wired/wireless network' clusters, such as WHAN and/or WPAN, which may or may not include wired connections, such as LAN, within the network. The high-speed wireless backbone connection, Backbone Connection Facilitator (BCF), is based on a method of dynamically creating concurrent data pipelines for the purpose of meeting the dynamic data bandwidth demand in addition to providing a unified home network by linking a number of 'short-range wired/wireless network' clusters. This invention utilizes some antenna technologies such as MIMO (multiple-In, multiple-out) and/or the SDMA (Spatial Division Multiple Access) to minimize the transmit power, to reduce the interferences with other wireless networks, and to support the real time communication such as streaming line video applications.

The Backbone Connection Facilitator (BCF) is composed of the lowest three layers of the 7-layer OSI model, the BCF-PHY layer, the BCF-Data-Link-Layer, and the BCF-Network-Layer. Each individual small wired/wireless network cluster contains one BCF.

The BCF-PHY layer consists of antenna array, which may include MIMO and/or SDMA, along with a PHY Base Band controller that performs the beam-forming operation. The BCF-Data-Link-Layer provides the MAC functionality for the backbone wireless communication channel. The BCF-Network-Layer assembles the packet, provides the source and destination address, the target device address, and the BCF-PHY beam-forming information to the MAC. For example, the data packet format for the high-speed backbone connection can be the 802.15.3C packet format if the backbone is connected via 60 GHz channel. In this case, since each channel is capable of carrying 800 Mbps-2 Gbps, the BCF-Network-Layer may decide to use a multiple of 60 GHz channel to support the 6 Gbps HDMI/HDPC protocols.

In addition to the general network functions, the BCF-Network-Layer is also responsible for parsing and assembling the packet payloads for the high-speed backbone connection. The BCF-Network-Layer constructs the packet payload based on the data rate demand and the type of the communication requirements.

BRIEF DESCRIPTION OF THE DRAWINGS

A complete understanding of the present invention may be obtained by reference to the accompanying drawings, when considered in conjunction with the subsequent, detailed description, in which:

FIG. 1 is a detail view of a high data rate single packet being transferred as two slower rate backbone connection facilitator (bcf) packets;

FIG. 2 is a detail view of a two slower data rate packets are transferred as a single high data rate backbone connection facilitator (bcf) packet;

FIG. 3 is a detail view of a data generated by a low data rate source and a high data rate source are transferred as two high data backbone connection facilitator (bcf) packets;

FIG. 4 is a detail view of a direct wireless connection between two 'short-range wireless network' clusters within a home or a small office;

FIG. 5 is a detail view of a direct wireless connection among more than two 'short-range wired/wireless network' clusters within home or a small office;

FIG. 6 is a detail view of a direct wireless connection with concurrent high-speed data pipeline between two 'short-range wired/wireless network' clusters within a home or a small office; and FIG. 7 is a detail view of an example state diagram of the backbone connection facilitator that connects 'short-range wired/wireless network' clusters within a home or a small office.

For purposes of clarity and brevity, like elements and components will bear the same designations and numbering throughout the Figures.

DESCRIPTION OF THE PREFERRED EMBODIMENT

This patent presents a method of constructing a practical wireless home network using the newly developed adaptive antenna technology, such as MIMO (Multiple_In_Multiple_Out), SDMA Spatial Division Mulitple Access), and the newly defined IEEE (802) wireless protocols, such as 802.11n and 802.15.3.

The invention demonstrates how to construct a wireless home network that unifies the home entertainment network, the home data network, and the Mobile network. This invention provides seamless interface among these networks with a very high data generation/transfer rate (6 Gbps) to be able to support any future communication protocols including the HDMI/HDPC protocol.

Example of the Backbone Connection Facilitator (BCF) Packet payload Construction Criteria is given at below.

Criterion-1 case: High data transfer rate generated by a single source;
   The BCF-Network-Layer parses the original packet with the bit slicing technique to create multiple lower data rate packets (Refer to FIG. 1), and the BCF-Data-Link-Layer sends these packets via concurrent data pipelines.

Criterion-2 case: High data transfer rate to handle the data generated by multiple of low data rate sources;
   The BCF-Network-Layer constructs the high-speed payload by merging a number of low data rate packets (Refer to FIG. 2). The BCF-Network-Layer may merge the low data rate packets by bit-wise multiplexing, by byte-wire multiplexing, or by word-wise multiplexing. FIG. 2 shows two examples where the BCF-Data-Link-Layer and the BCF-PHY-Layer transfer the bit-wise multiplexed data, and alternatively the byte-wire multiplexed data.

Criterion-3 case: High data transfer rate to handle a number of simultaneously generated low data rate packets and high data rate packets;
   The BCF-Network-Layer constructs evenly distributed high-speed BCF packets by merging a number of low data rate packets with high data rate packets (Refer to FIG. 3). FIG. 3 shows that the Backbone packet-A transfers bytes 0, 2, 3, 5, 6, 8, 9 . . . (3n−1), 3n of the original packet-A. The Backbone packet-B transfers bytes 1, 4, 7, . . . (3n+1) of the original packet-A, and the original packet-B.

As theses 3 example cases show, the BCF-Network-Layer parses the original data packet, and assembles the high-speed backbone packets to optimize the power dissipation, and also the number of channels it occupies.

Example of Employing Smart/Adaptive Antenna Technology is shown at below.

This invention also incorporates the Smart/Adaptive antenna Technology to increase the communication distance and to reduce the power dissipation. The high-speed backbone connection may contain more than one PHY that is based on antenna technology such as -MIMO. The MAC controls the antennas to simultaneously connect multiple 'short-range wired/wireless network' clusters. The MAC also controls the transmit power based on the range measurements.

Case 1: Direct Wireless Connection between two 'short-range wired/wireless network' clusters;

FIG. 4 shows the case when one 'short-range wired/wireless network' cluster is connected to another 'short-range wired/wireless network' cluster via Smart/Adaptive Antenna.

Case 2: Direct Wireless Connection among more than two 'short-range wired/wireless network' clusters;

FIG. 5 shows the case when one 'short-range wired/wireless network' cluster is connected to multiple 'short-range wired/wireless network' clusters via Smart/Adaptive Antenna. This configuration allows the one 'short-range wired/wireless network' cluster to send broadcast information to other 'short-range wired/wireless network' clusters.

Case 3: Direct Wireless Connection with Concurrent High-Speed Data Pipelines between more than two 'short-range wired/wireless network' clusters;

FIG. 6 shows an example of one 'short-range wired/wireless network' cluster is connected to another 'short-range wired/wireless network' cluster via concurrent high-speed data pipelines. This configuration allows the one 'short-range wireless network' cluster to transfer data via concurrent wireless channels.

The description of this application presents an example of the method to link various wired/wireless home networks. A dynamically sizable backbone high-speed data pipeline can be constructed with this method for the purpose of supporting such protocol as HDMI/HDPC, which requires up to 6 Gbps data transfer rate.

This invention requires at least one device that is capable of supporting the Backbone Connection Facilitator (BCF) function. The BCF may be implemented in any wireless device with/without wired connection. The BCF function does not have to be an exclusive function in a device. Since any UWB wireless device needs to support the lowest 3 layers of the 7 Layer OSI model, a person trained in this art should be able to incorporate the BCF function in an existing wireless device design.

Example of Implementing a Backbone Connection Facilitator (BCF) Based Wireless Network is given at below.

When a user wishes to link a new device (equipment) to an exiting home network, the user needs to register the device with the network. The registration process can be as simple as connecting the wire into a wired network, or going through the wireless device association process. Once the device is registered, the registration information is shared among all wired/wireless networks via the BCF, and the user can carry the device any place in his or her home without loosing the connection. If the mobile device is a WUSB device, all WUSB Hosts in various home networks (connected via BCF) support the connectivity by sharing the WUSB device's identification. Therefore, the user only needs to register the device once as long as the device stays within the BCF connected network.

After device registration, the BCF-Network-Layer, using the standard UWB (WiMedia) protocol or wired protocol, keeps track of the physical location of the device so that all BCF know in which of the 'short-range wired/wireless network' clusters the device currently resides. If a BCF-Network-Layer determines that the device is within its 'short-range wireless network' cluster, the BCF-Data-Link-Layer is informed by the BCF-Network-Layer to service the device. Since a Data-Link-Layer normally rejects any packet that is not recognized as the destination address it serves, it is important for the BCF-Network-Layer to inform all other short range networks about the all device addresses in its network.

Once the process is completed, the device is ready to communicate with any devices that are connected via the BCFs in the home network.

The shared knowledge among BCFs about the whereabouts of each device in the home network allows the BCF-Network-Layer to correctly determine if the packet transfers are intra 'short-range wired/wireless network' cluster, or inter 'short-range wired/wireless network' clusters. If the BCF makes a decision to transfer packets inter 'short-range wired/wireless network' clusters, the BCF performs the packet parse-assembly function to construct packets that satisfies the wireless protocol that the BCF is using.

For example, since the BCF uses a well-defined standard protocol such as 802.15.3C to provide high-speed data link, the BCF only needs to construct the 820.15.3C payload based upon the method discussed in this invention.

The BCF-Network-Layer that receives BCF packets parses the payload, and assembles short-range packets. Since the short-range packets were encapsulated as the payload(s) of the high-speed BCF packet, the receiving BCF-Network-Layer does not need to translate the packet protocol. It only needs to re-format the payload(s) based on the "Example of the Backbone Connection Facilitator (BCF) Packet Payload Construction Criteria" section prior to sending to the BCF-Data-Link-Layer (MAC).

FIG. 7 shows an example state diagram of the BCF operation that is described in this patent.

FIG. 7 consists of two independent state paths. The first path that follows "Packet Received (751)" shows how the BCF transfers data from one 'short-range wired/wireless network' cluster to another 'short-range wired/wireless network' cluster via concurrent high-speed data pipeline. The second path that follows "Detect new device (752)" shows how a new device is registered into the unified Wireless Home Area Network.

The BCF stays in the IDLE (701) state unless it receives a packet (751) or it detects a new device (752). When the BCF detects a new device, it goes through the registration state (709), where the BCF stores the address and the protocol type of the new device. After the registration (709), the BCF notifies (710) other BCFs in the home area network about the new device. When it completes the notification process (781), the BCF goes back to the IDLE state (701).

During normal data transfer operation; when the BCF receives a packet (751), which can be either from another BCF or from its own 'short-range wired/wireless network' cluster, it moves to the next state where the BCF checks (702) the packet type. If the packet received is a BCF packet (754), it extracts the short-range network packet (704) from the BCF packet payload. After the packet check (702) process, the BCF goes into the destination address check state (703). In this state, if the BCF decides that the destination is not within the 'short-range wired/wireless network' cluster (756), the BCF constructs a BCF packet, and forwards it (706) to the BCF that is in another 'short-range wired/wireless network' cluster that contains the destination device. When the packet routing to another BCF is completed (782), it goes back to the IDLE state (701). If the destination device is within the its own 'short-range wired/wireless network' cluster (755), the BCF checks for the protocol types of the source and destination devices (705), If the source and destination shares the same protocol (757), the BCF does not need to take any further action, and goes back to the IDLE (701) state. However, if the source and destination use different protocols (758), the BCF converts the protocol (707), and routs to the destination (708), then goes back (759) to the IDLE state.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of constructing a wireless high speed backbone connection that unifies various wired/wireless network clusters by means of employing a smart/adaptive antenna technique and dynamically creating concurrent data pipelines for providing a high-speed data link based on the smart/adaptive antenna and concurrent data pipeline that unifies various wired/wireless network clusters, comprising:

means for parsing an original packet with a bit slicing technique to create multiple lower data rate packets, which can be transferred via concurrent lower data rate backbone connection facilitator (bcf) data pipelines;

means for constructing a high-speed payload by merging a number of lower data rate packets with a bit/byte/word-wise multiplexing technique for the purpose of concurrently transferring multiple packets via a signal bcf channel;

means for parsing and merging a number of low data rate and high data rate original packets to create an evenly distributed high speed payload for the backbone pipelines with the purpose of optimizing the power dissipation and increasing the channel occupancy rate;

means for providing a single channel wireless backbone connection between two 'short-range wired/wireless network' clusters within a home or small office by means of a beam forming technique;

means for providing a multi-channel wireless backbone connection from a '-short-range wired/wireless network' cluster to two or more other 'short-range wired/wireless network' clusters for the purpose of simulcasting, broad casting, and/or multicasting the same or different data within a home or a small office using a number of independent bcf pipelines;

means for providing a multi-channel wireless backbone connections from one 'short-range range wired/wireless network' cluster to another 'short-range wired/wireless network' cluster for the purpose of increasing the data transfer rate between any two 'short-range wired/wireless network' clusters within a home or small office by increasing the number of concurrent bcf pipelines;

means for the local backbone connection facilitator (bcf) recognizing a new wired/wireless device within a home or small office, and registering into the local bcf that serves as the 'short-range wired/wireless network' cluster that contains the new device; means for a local bcf notifying other bcfs within the home about the new device, and other bcfs registering the new device;

means for deciding that the packet to be transferred is in a bcf format;

means for converting the received bcf packets to short range packets to identify a destination address of the packet;

means for comparing the packet protocol of a source and destination devices to see if protocol conversion is needed before delivering the packet to the destination device;

means for converting short-range packets to bcf packets for inter 'short-range wired/wireless network' cluster transfer; and means for a local bcf converting the received bcf packet protocol to the destination packet protocol for inter 'short-range wired/wireless network' cluster communication, or converting the source device protocol to the destination device protocol for intra 'short-range wired/wireless network' cluster.

2. The method of constructing wireless high speed backbone connection that unifies various wired/wireless network clusters by means of employing the smart/adaptive antenna technique and dynamically creating concurrent data pipelines in accordance with claim 1, wherein said means for parsing the original packet with the bit slicing technique to create a multiple lower data rate packets that can be transferred via concurrent lower data rate (bcf) data pipelines comprises a packet splitter functional element.

3. The method of constructing wireless high speed backbone connection that unifies various wired/wireless network clusters by means of employing the smart/adaptive antenna technique and dynamically creating concurrent data pipelines in accordance with claim 1, wherein said means for constructing a high-speed payload by merging a number of lower data rate packets with a bit/byte/word-wise multiplexing technique for the purpose of transferring multiple packets via a signal bcf channel comprises a packet merger functional element.

4. The method of constructing wireless high speed backbone connection that unifies various wired/wireless network clusters by means of employing the smart/adaptive antenna technique and dynamically creating concurrent data pipelines in accordance with claim 1, wherein said means for parsing and merging a number of low data rate and high data rate original packets to create an evenly distributed high speed payload for the backbone pipelines with the purpose of optimizing the power dissipation and increasing the channel occupancy rate comprises a packet mixer functional element.

5. The method of constructing wireless high speed backbone connection that unifies various wired/wireless network clusters by means of employing the smart/adaptive antenna technique and dynamically creating concurrent data pipelines in accordance with claim 1, wherein said means for providing a single channel wireless backbone connection between two 'short-range wired/wireless network' clusters within a home or small office by means of beam forming technique comprises a single channel backbone connector functional element.

6. The method of constructing wireless high speed backbone connection that unifies various wired/wireless network clusters by means of employing the smart/adaptive antenna technique and dynamically creating concurrent data pipelines in accordance with claim 1, wherein said means for providing multi-channel wireless backbone connection from a 'short-range wired/wireless network' cluster to two or more other 'short-range wired/wireless network' clusters for the purpose of simulcasting, broadcasting, and/or multicasting the same or different data within a home or small office using a number of independent bcf pipelines employing the antenna beam forming technique comprises a functional element, multi-channel/multi-cast backbone connector.

7. The method of constructing wireless high speed backbone connection that unifies various wired/wireless network clusters by means of employing the smart/adaptive antenna technique and dynamically creating concurrent data pipelines in accordance with claim 1, wherein said means for providing multi-channel wireless backbone connections from one 'short-range wired/wireless network' cluster to another 'short-range wired/wireless network' cluster for the purpose of increasing the data transfer rate between any two 'short-range wired/wireless network' clusters within a home or small office by increasing the number of concurrent bcf pipelines comprises a multi-channel/uni-cast backbone connector functional element.

8. The method of constructing wireless high speed backbone connection that unifies various wired/wireless network clusters oy means of employing the smart/adaptive antenna technique and dynamically creating concurrent data pipelines in accordance with claim 1, wherein said means for the local backbone connection facilitator (bcf) recognizing a new wired/wireless device within a home or small office, and registering into the local bcf that serves as the 'short-range wired/wireless network' cluster that contains the new device comprises a registration functional element.

9. The method of constructing wireless high speed backbone connection that unifies various wired/wireless network clusters by means of employing the smart/adaptive antenna technique and dynamically creating concurrent data pipelines in accordance with claim 1, wherein said means for the local bcf notifying other bcfs within the home about the new device, and other bcfs registering the new device comprises a notify functional element.

10. The method of constructing wireless high speed backbone connection that unifies various wired/wireless network clusters by means of employing the smart/adaptive antenna technique and dynamically creating concurrent data pipelines in accordance with claim 1, wherein said means for deciding the packet to be transferred is in a bcf format comprises a check for bcf packet functional element.

11. The method of constructing wireless high speed backbone connection that unifies various wired/wireless network clusters by means of employing the smart/adaptive antenna technique and dynamically creating concurrent data pipelines in accordance with claim 1, wherein said means for converting the received bcf packets to short range packets to identify the destination address of the packet comprises a short range packet extraction functional element.

12. The method of constructing wireless high speed backbone connection that unifies various wired/wireless network clusters by means of employing the smart/adaptive antenna technique and dynamically creating concurrent data pipelines in accordance with claim 1, wherein said means for comparing the packet protocol of the source and the destination devices to see if protocol conversion is needed before delivering the packet to the destination device comprises a check destination protocol functional element.

13. The method of constructing wireless high speed backbone connection that unifies various wired/wireless network clusters by means of employing the smart/adaptive antenna technique and dynamically creating concurrent data pipelines in accordance with claim 1, wherein said means for converting short-range packets to bcf packets for inter 'short-range wired/wireless network' cluster transfer comprises a bcf packet construction functional element.

14. The method of constructing wireless high speed backbone connection that unifies various wired/wireless network clusters by means of employing the smart/adaptive antenna technique and dynamically creating concurrent data pipelines in accordance with claim 1, wherein said means for the local bcf converting the received bcf packet protocol to the destination packet protocol for inter 'short-range wired/wireless network' cluster communication, or converting the source device protocol to the destination device protocol for intra 'short-range wired/wireless network' cluster comprises a convert protocol functional element.

15. A method of constructing a wireless high speed backbone connection that unifies various wired/wireless network clusters by means of employing a smart/adaptive antenna technique and dynamically creating concurrent data pipelines for providing a high-speed data link based on the smart/adaptive antenna and concurrent data pipeline that unifies various wired/wireless network clusters, comprising:

a packet splitter functional element for parsing an original packet with a bit slicing technique to create multiple lower data rate packets, which can be transferred via concurrent lower data rate backbone connection facilitator (bcf) data pipelines;

a packet merger functional element for constructing a high-speed payload by merging a number of lower data rate packets with a bit/byte/word-wise multiplexing technique for the purpose of concurrently transferring multiple packets via a signal bcf channel;

a packet mixer functional element for parsing and merging a number of low data rate and high data rate original packets to create an evenly distributed high speed payload for the backbone pipelines with the purpose of optimizing the power dissipation and increasing the channel occupancy rate;

a single channel backbone connector functional element for providing a single channel wireless backbone connection between two 'short-range wired/wireless network' clusters within a home or small office by means of a beam forming technique;

a multi-channel/multi-cast backbone connector functional element for providing a multi-channel wireless backbone connection from a 'short-range wired/wireless network' cluster to two or more other 'short-range wired/wireless network' clusters for the purpose of simulcasting, broad casting, and/or multicasting the same or different data within a home or a small office using a number of independent bcf pipelines;

a multi-channel/uni-cast backbone connector for providing multi-channel wireless backbone connections from one 'short-range wired/wireless network' cluster to another 'short-range wired/wireless network' cluster for the purpose of increasing the data transfer rate between any two 'short-range wired/wireless network' clusters within a home or small office by increasing the number of concurrent bcf pipelines;

a registration functional element for the local backbone connection facilitator (bcf) recognizing a new wired/wireless device within a home or small office, and registering into the local bcf that serves as the 'short-range wired/wireless network' cluster that contains the new device;

a notify functional element for a local bcf notifying other bcfs within the home about the new device, and other bcfs registering the new device;

a check for bcf packet functional element for deciding that the packet to be transferred is in a bcf format;

a short range packet extraction functional element for converting the received bcf packets to short range packets to identify a destination address of the packet;

a check destination protocol functional element for comparing the packet protocol of a source and destination devices to see if protocol conversion is needed before delivering the packet to the destination device;

a bcf packet constructor functional element for converting short-range packets to bcf packets for inter 'short-range wired/wireless network' cluster transfer; and a convert protocol functional element for a local bcf converting the received bcf packet protocol to the destination packet protocol for inter 'short-range wired/wireless network' cluster communication, or converting the source device protocol to the destination device protocol for intra 'short-range wired/wireless network' cluster.

16. The method of constructing wireless high speed backbone connection that unifies various wired/wireless network clusters by means of employing the smart/adaptive antenna technique and dynamically creating concurrent data pipelines as recited in claim 15, further comprising:

a functional element, long range packet check, for deciding whether the destination device is within its 'short-range wired/wireless network' cluster or it belongs to other 'short-range wired/wireless network' cluster.

* * * * *